E. MEITNER.
SINGLE GYRO STABILIZED PENDULUM.
APPLICATION FILED APR. 6, 1917.

1,324,128.

Patented Dec. 9, 1919.
2 SHEETS—SHEET 1.

INVENTOR
ELEMER MEITNER
BY
Herbert H. Thompson
ATTORNEY.

E. MEITNER.
SINGLE GYRO STABILIZED PENDULUM.
APPLICATION FILED APR. 6, 1917.

1,324,128.

Patented Dec. 9, 1919.
2 SHEETS—SHEET 2.

INVENTOR
ELEMER MEITNER
BY
Herbert H. Thompson
ATTORNEY

UNITED STATES PATENT OFFICE.

ELEMER MEITNER, OF BROOKLYN, NEW YORK, ASSIGNOR TO SPERRY GYROSCOPE COMPANY, OF BROOKLYN, NEW YORK, A CORPORATION OF NEW YORK.

SINGLE-GYRO-STABILIZED PENDULUM.

1,324,128.      Specification of Letters Patent.      Patented Dec. 9, 1919.

Application filed April 6, 1917. Serial No. 160,181.

*To all whom it may concern:*

Be it known that I, ELEMER MEITNER, a subject of the King of Hungary, residing at 138 Montague street, Brooklyn, in the county of Kings and State of New York, have invented certain new and useful Improvements in Single-Gyro-Stabilized Pendulums, of which the following is a specification.

This invention has for its object the provision of means whereby a reference line or plane may be held at a fixed angle with respect to the surface of the earth under all conditions. More specifically it relates to means for stabilizing a reference line or plane on an unstable vehicle, whereby the vehicle may be stabilized. My invention is, however, independent of the means to control the stability of the vehicle from the stabilized plane and furthermore it is not limited to such use but is adapted for use as an inclinometer and other purposes.

The basis of the invention is a pendulum, the stability of which is increased by a single gyroscope. While pendulums of all types, especially those stabilized by gyroscopes, will maintain a fixed reference plane on a body which is merely tilted or which moves in a straight line at a uniform velocity, they become useless when mounted on a body which moves so as to cause acceleration pressures, such as those due to starting or stopping, turning in azimuth or turning up or down. My invention overcomes these defects by the means which will now be described in detail:—

Figure 1:
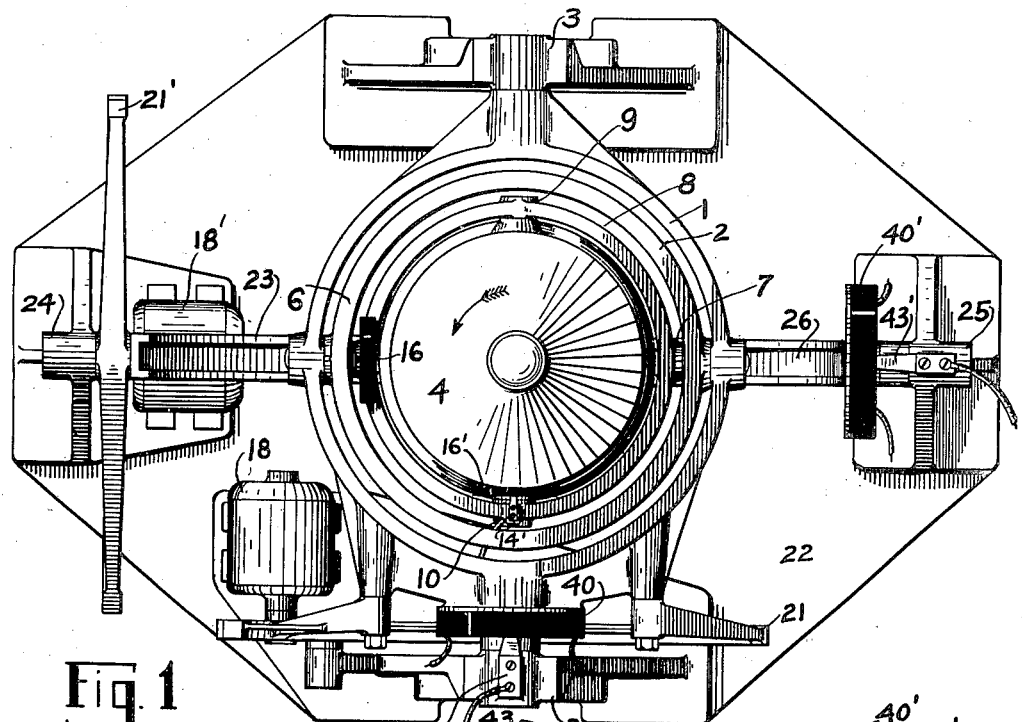
Figure 1 is a plan view of one form of my invention.
Figure 2:
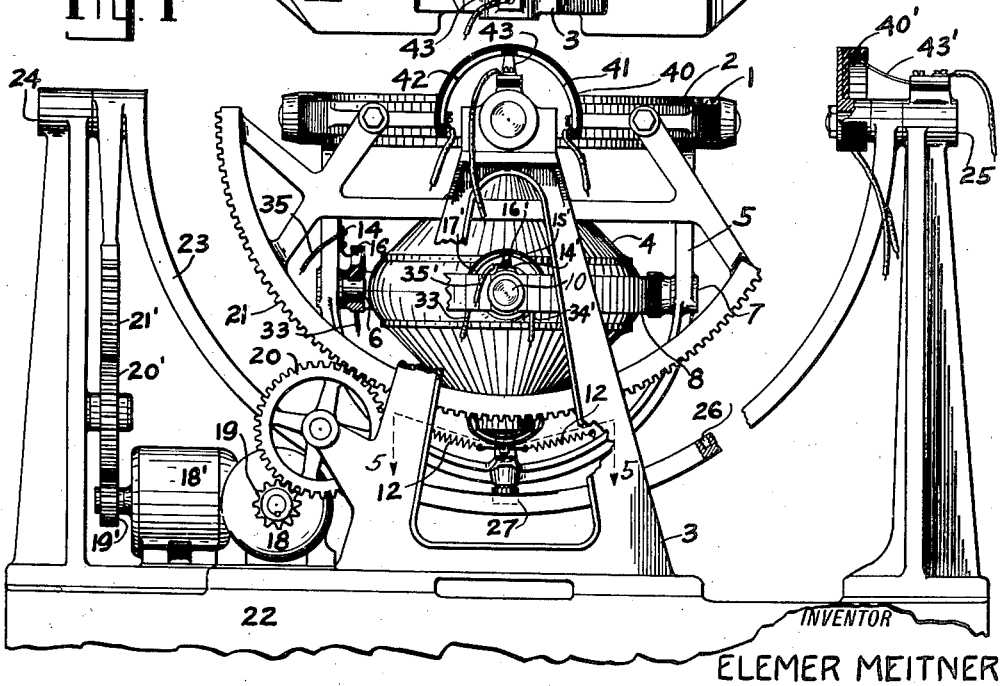
Fig. 2 is an elevation of the same with parts broken away.
Figure 5:
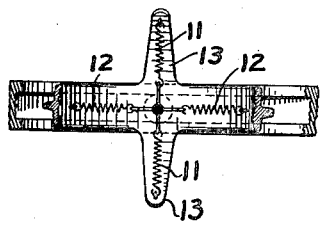
Fig. 5 is a detail sectional view of certain of the parts of the form of invention illustrated in Figs. 1 and 2 and taken on the line 5—5 of Fig. 2.

The form of my invention shown in Figs. 1 and 2 comprises a single rotor or gyroscopic wheel mounted with three degrees of freedom on a support shown as a pair of Cardan rings 1, 2 pivoted in suitable brackets such as the brackets 3, 3. The gyroscope designated generally as 4, is shown connected to one of the Cardan rings 2 so as to have three degrees of freedom with respect to said ring. Such connections may take the form illustrated in Fig. 2 in which a downwardly extending U-shaped member 5 is fixed to the inner ring 2 and has pivoted thereto, at 6 and 7, a ring 8. The last mentioned ring pivotally carries the gyro 4 at pivots 9 and 10, the axis 9—10 being at an angle, shown as a right angle, to the axis 6—7 and the gyro 4 normally spinning about a vertical axis. Suitable centralizing means is provided for the gyro, one embodiment of such means being springs 11, 11, 12 and 12, shown in Figs. 2 and 5. These springs each have one end secured to the bottom end of the gyro and the springs 12, 12 have the other ends secured to the member 5 while the other ends of springs 11, 11 are secured to two extensions 13, 13 of the member 5.

To overcome and eliminate the effect of acceleration pressures I use, what I term, force applying means controlled by precession of the gyro about either or both of its precession axes 6—7 or 9—10, said force applying means being designed to oppose an external force or forces and being described more in detail hereinafter.

Suitable means are employed, according to my invention, to make use of the precession of the gyro to control the force applying mechanism and such means may take the form of electrical contacts as shown in Figs. 1 and 2. For utilizing precession about the axis 9—10 a disk 16' of insulation may be secured to the frame of the gyro 4 and a contact 14' mounted on but insulated from the ring 8. The disk 16' is shown as carrying two contact segments 15' and 17' spaced apart and consequently insulated from each other. In the normal position of the gyro 4 the contact 14' engages the insulating disk 16' but upon precession of the gyro about the axis 9—10 one or the other of the contacts 15', 17' will be brought into engagement with the contact 14' depending on the direction of precession. Similar contact means 14, 15, 16 and 17 are provided to utilize precession about the axis 6—7. The last mentioned contacts may be identical to contacts 14', 15' and 17' except that contact 14 is mounted on the member 5 and the disk 16 mounted on the ring 8.

The previously mentioned force applying means may assume various forms, one of which is illustrated in Figs. 1 and 2. In these figures an electric motor 18 is shown mounted on the base 22 which motor is adapted to apply a torque on the system about the pivotal axis of the ring 1 through suitable connections. These connections may be in the form of gearing 19, 20 and 21 of which the pinion 19 is mounted on the motor shaft the idle gear 20 on one of the brackets 3 and the segmental gear 21 rigidly connected to the ring 1. Similar means 18' to 21', inclusive, may be provided for applying a torque about the pivotal axis of the ring 2 and if it is desired to fix the motor 18' with respect to the base 22 as in Figs. 1 and 2 suitable means for connecting the segmental gear 21' with the pendulum are employed. Such means may take the form illustrated in Figs. 1 and 2 in which a swinging bail or loop 23, carrying the segmental gear 21', is pivotally mounted in journal brackets 24, 25 secured to the base 22. The bail 23 is shown as provided with a channel 26 in which a roller 27 secured to the bottom of the U-shaped member 5 is adapted to travel.

Figure 4:
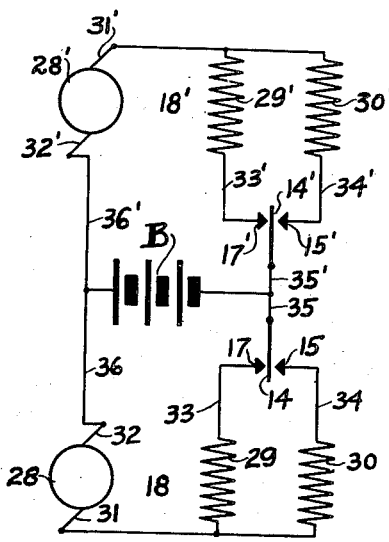
Fig. 4 is a diagram of electrical connections applicable to either form of my invention.

One form of control of the motors 18, 18' by the contacts 14, 15 and 17 and 14', 15' and 17' is indicated diagrammatically in Fig. 4. The contacts 14', 15' and 17' are adapted to cause rotation of the motor 18' in one direction or the other depending on the direction of precession of the gyro 4 about axis 9—10. One form of motor which adapts itself readily to the above mentioned control is indicated diagrammatically as 18' in Fig. 4. This motor comprises an armature 28' having one brush 31' connected to one end of the oppositely wound field coils 29' and 30'. The other ends of said coils 29' and 30' are shown as connected to the contact segments 17' and 15' respectively by means of conductors 33' and 34'. The contact 14' and brush 32' may be connected to opposite poles of a suitable source of E. M. F., such as a battery B by means of conductors 35' and 36' respectively. Similarly the motor 18 may be controlled by contacts 14, 15 and 17, the parts and connections being identical with those for motor 18' and designated by the same reference characters with the prime removed.

The operation of my invention, as thus far disclosed, is as follows: Assuming that the gyro rotor is being constantly driven in the direction of the arrow in Fig. 1 and that an external force is applied at the point 27 tending to move this point down into the sheet as viewed in Fig. 2, the gyro 4 being acted upon through one of the springs 11, will precess in a clockwise direction about the axis 9—10 as viewed in Fig. 1. This precession will be much more rapid and of greater magnitude than the slight movement necessary to put the said spring 11 under tension and will cause the contacts 17' and 14' to engage, energizing the motor armature 28' and field 29' to cause the motor 18' to exert a torque through the gearing 19', 20', 21' and bail 23 to the point 27 opposing the torque due to the external force and causing the gyro 4 to precess back to its normal position. Similarly an external force applied at the point 27 but in a reverse direction to that first assumed will cause counter-clockwise precession of the gyro and energization of the motor 18' through the engagement of contacts 15', 14' to cause the motor 18' to rotate in an opposite direction, as the opposite field 30' is now energized.

Any external force acting at the point 27 in the plane of the sheet (Fig. 2) will cause precession of the gyro 4 about its axis 6—7 to cause the motor 18 to oppose this force and cause the gyro to precess back to normal position in a manner similar to the operation above described for motor 18' and its control.

From the above description it is obvious that the plane of the ring 2 will be stabilized and this stabilized plane may be used in various ways and for various purposes. For example the rings 1 and 2 may control contacts adapted to be used to control the stabilization of an aeroplane. Thus the ring 1 may carry a disk 40 of insulation on which are mounted spaced apart contact segments 41 and 42, and a coöperating contact 43 may be mounted on, but insulated from, the top of one of the brackets 3. Normally the contact 43 is between the segments 41 and 42 but relative movement of the ring 1 and the base 22 would cause one or the other of segments 41 or 42 to engage contact 43. Similarly the bail 26 may be provided with a disk 40' of insulation bearing contacts identical to segments 41 and 42 and the bracket 25 may carry a contact 43' similar to the contact 43. The contacts 43' etc. would be actuated by relative movement of the ring 2 and base 22 about the axis 24—25.

Figure 3:
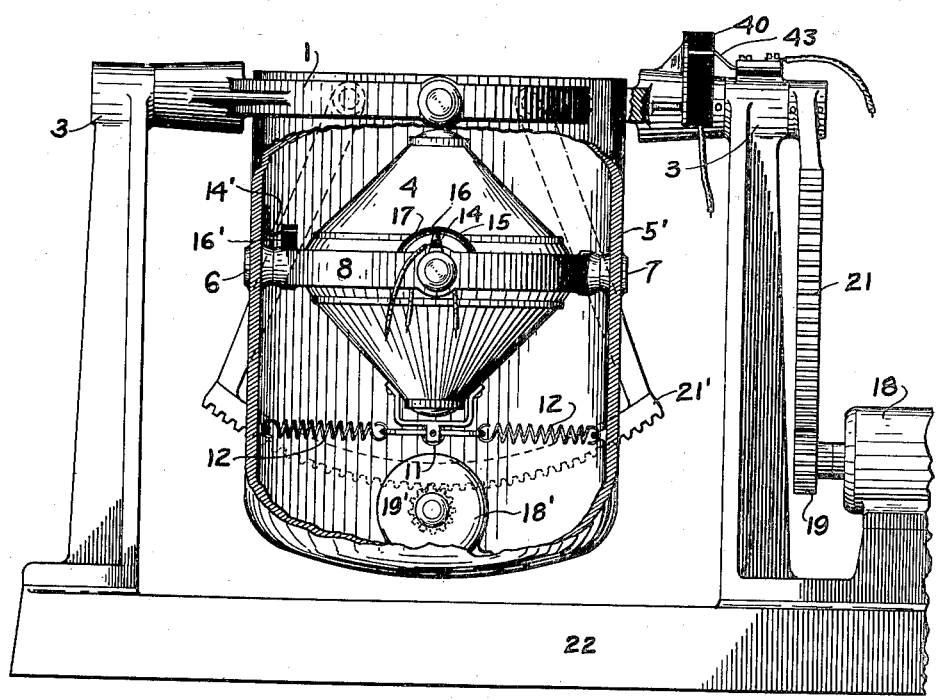
Fig. 3 is an elevation of a different form of my invention.

While I am aware that a single motor and clutches might be employed as the force applying means, I prefer to illustrate the means shown. It is to be understood that my invention may be modified in various ways. For example, if it is desired to dispense with the bail the physical embodiment of the invention may take the form illustrated in Fig. 3 in which the ring 2 and U-shaped member 5 are replaced by a cup-shaped member 5'. The motor 18' is fixed to bottom of the member 5' and the segmental gear 21' is fixed to the ring 1 and adapted to be engaged by the pinion 19' on the shaft of the motor 18'. The remaining construction and the operation of the form shown in Fig. 3 are similar to that of the form first described and no additional explanation is necessary.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a gyroscopic apparatus, a universally mounted support, a gyroscope mounted on said support so as to stabilize it about its horizontal axes of support, and means responsive to precession of said gyroscope for causing a torque to be exerted about either of said axes.

2. In a gyroscopic apparatus, a pivoted support, which, together with the mechanism it supports, is pendulous, a single gyroscope mounted on said support and means controlled by said gyroscope for eliminating the effect of pressure on said support.

3. In a gyroscopic stabilizing system, a pendulous support, means for exerting a torque on said support about an axis, means for exerting a torque on said support about a second axis at an angle to said first-mentioned axis, and a single gyroscope for controlling both of said means.

4. In a gyroscopic stabilizing system, a pendulous support, means for exerting a torque on said support about a plurality of axes and a single gyroscope mounted for precessional movement with relation to said support, said gyroscope controlling said means.

5. In a gyroscopic pendulum, a single gyroscope, means for causing precession of said gyroscope about one axis, and means for causing precession of said gyroscope about an axis at an angle to said first named axis both of said means being brought into operation by precession of said gyroscope.

6. In combination, a universally mounted pendulum, force applying means for opposing external acceleration pressures on said pendulum exerted in any direction in a horizontal plane, and a single gyroscope mounted for precessional movement with relation to said pendulum, said force applying means being brought into operation by precession of said gyroscope.

7. In a gyroscopic stabilizing system, a pendulous support, means comprising a motor and connections for exerting a torque on said support about one axis, means comprising a second motor and connections for exerting a torque on said support about a different axis and a gyro for controlling both means.

8. Means for stabilizing a plane comprising force-applying means, a single gyroscope mounted for precession about two axes and connections between said gyro and force-applying means, said connections being controlled by precession of said gyro.

9. In a stabilized gyroscopic pendulum, a single gyroscope mounted for precession about a plurality of axes, force-applying means adapted to apply a torque about a plurality of axes and means connecting said gyro and force-applying means whereby precession of the gyro about any one of its axes causes a torque to be applied about an axis at an angle to said last mentioned axis.

10. In a gyroscopic pendulum, a single gyroscope mounted for precession about a plurality of axes and means for causing precession of said gyro about any or all of said axes, the means for causing precession about any one axis being called into operation by precession of said gyro about the same axis.

11. In gyroscopic apparatus, the combination with a universally mounted gyroscope, a universally mounted pendulous member adjacent thereto, yielding means connecting said gyroscope and said member and means brought into action by movements of said gyroscope about at least one of its axes for causing torques to be applied thereon.

12. In gyroscopic apparatus, the combination with a gyroscope mounted for oscillation about a plurality of axes, a pendulous member mounted for oscillation about at least one axis, a yielding coupling between said gyroscope and member about said last named axis, and means brought into action by relative movement of said gyroscope and pendulum about another axis for causing a torque to be applied about said first axis.

13. In combination, a pendulum, a gyroscope mounted for precession about a plurality of axes with relation to said pendulum and a yielding connection between said gyro and pendulum whereby said pendulum may be stabilized.

14. In combination, a support mounted for oscillation, a frame mounted for oscillation about a plurality of axes with respect to said support, a rotor rotatably mounted in said frame, means controlled by said rotor for exerting a torque on said support and yielding means connecting said frame and support.

15. In combination, a pendulum, means for exerting torques on said pendulum about a plurality of axes and a single gyroscope for controlling said means.

In testimony whereof I have affixed my signature.

ELEMER MEITNER.